Oct. 16, 1934.  C. S. JENNINGS ET AL  1,976,995
CARRIER
Filed Oct. 11, 1930  5 Sheets-Sheet 1
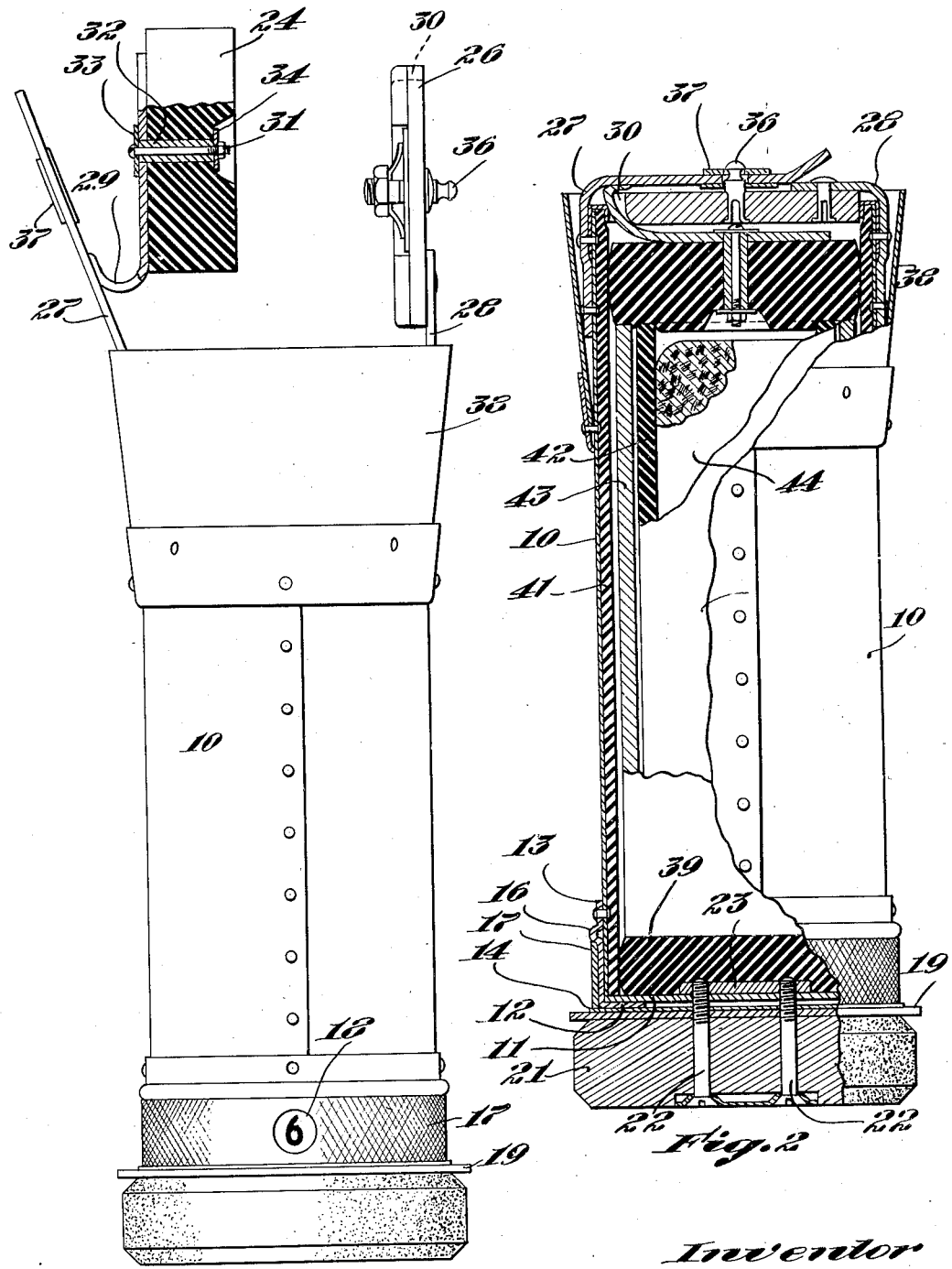
Inventor
Chester S. Jennings
August Koenig
by Roberts, Cushman & Woodbury
Att'ys.

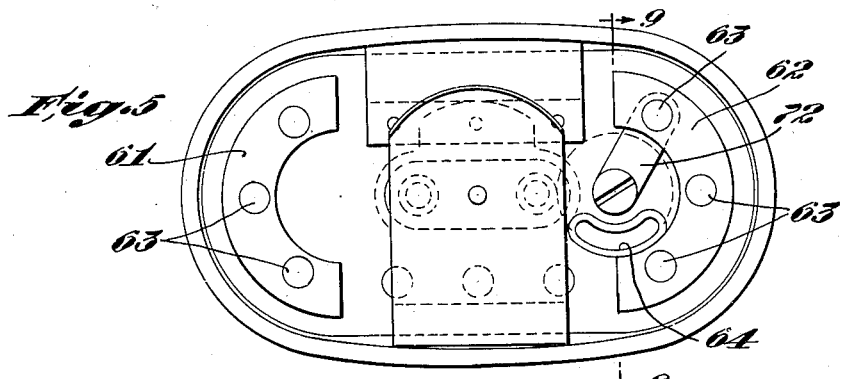
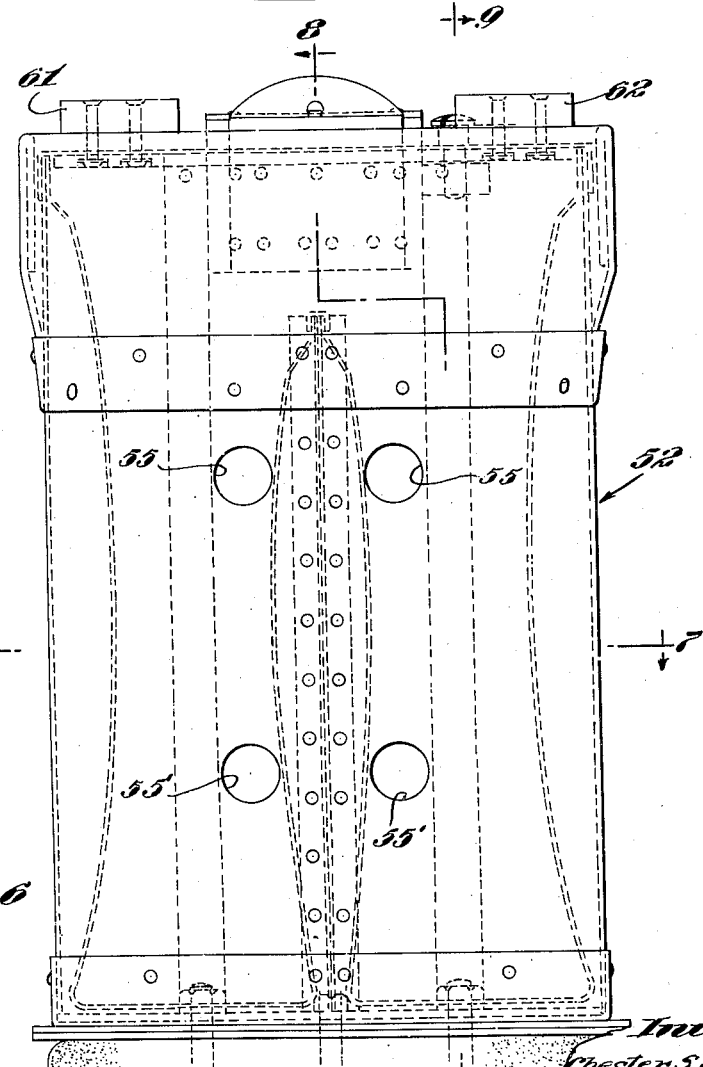

Oct. 16, 1934.   C. S. JENNINGS ET AL   1,976,995
CARRIER
Filed Oct. 11, 1930   5 Sheets-Sheet 4

Inventors
Chester S. Jennings
August Koenig
Attys.

Oct. 16, 1934.   C. S. JENNINGS ET AL   1,976,995
CARRIER
Filed Oct. 11, 1930   5 Sheets-Sheet 5

Inventors
Chester S. Jennings
August Koenig
by Roberts, Cushman & Woodberry
Attys.

Patented Oct. 16, 1934

1,976,995

UNITED STATES PATENT OFFICE 1,976,995

CARRIER

Chester S. Jennings and August Koenig, Syracuse, N. Y., assignors to The Lamson Company, Syracuse, N. Y., a corporation of Massachusetts Application October 11, 1930, Serial No. 488,085

15 Claims. (Cl. 243—35)

This invention relates to carriers for pneumatic despatch systems. Such carriers are ordinarily subjected to relatively rough handling at various stations as well as while in transit, and hence it is unsafe to attempt to transport fragile articles, such as dictaphone records, in carriers of the type commonly used for carrying papers, documents and the like.

Objects of the present invention are to provide an improved carrier suitable for conveying fragile articles or other matter which must be protected from impacts, shocks, jarring and the like; to provide a carrier for these purposes having improved indicating means thereon; to provide a carrier embodying improved means for damping vibration thereof as well as for absorbing shocks and impacts; and also to provide a carrier of this general class having an improved construction and arrangement of parts.

In the drawings:

Fig. 1 is a side elevation of a carrier with the closure members removed and with parts broken away for the purposes of illustration;

Fig. 2 is a side elevation of the carrier shown in Fig. 1 with parts broken away to illustrate the construction and also the manner in which a contained article is protected when the carrier is closed;

Fig. 5 is a top plan view of a modified form of carrier;

Fig. 6 is a side elevation of the carrier shown in Fig. 5;

Figure 3:
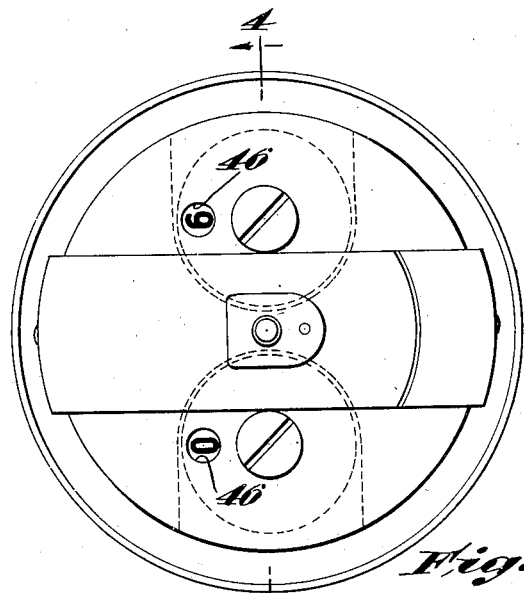
Fig. 3 is a top plan view of the carrier shown in Fig. 2.

In the apparatus selected for illustration in Figs. 1 to 4 of the drawings, the side walls of the carrier body comprise an outer shell 10 of relatively thin, spring, blue steel formed with lapped ends closely riveted together, which construction makes the shell rigid so that it will not buckle or twist from the most severe blow. One end of the shell is closed by an end piece 11 which rests between the end of the shell and an inwardly turned flange 12 formed on an annular member 13 riveted preferably to the outer side wall of the shell. A disk 14 is disposed against the lower side of the inwardly turned flange 12 and projects outwardly slightly beyond the annular member 13 to cooperate with an annular rib 16 formed around the upper portion of this member 13 to provide a guideway for a circumferentially movable annular band 17. This band is provided with an index in the form of an opening or exposure window 18 adapted to expose indicia carried on the outer side wall of the annular member 13. A disk 19 of leather or other flexible material is disposed against the disk 14 and a bumper 21 is secured against the disk 19 by attaching screws 22 which extend through the inner end wall 11 and have threaded engagement with a plate 23 disposed along the inner side of this end wall.

The open end of the carrier is provided with an inner closure member 24 and an outer closure member 26. These closure members are hinged to this end of the shell by means of straps 27 and 28 which are riveted preferably to diametrically opposite portions of the thin outer shell 10, as shown in Fig. 2. The strap 28 is riveted directly to the outer closure member 26. A third strap 29 is connected to the strap 27 and disposed across the upper surface of the inner closure member 24, being affixed thereto by an attaching bolt 31. A portion of the periphery of the outer closure member is cut away to provide a recess or notch 30 which receives the strap 29 when the carrier is closed. The bolt 31 is disposed in a sleeve 32 which extends through the central portion of the member 24, and suitable washers 33 and 34 are disposed on the bolt at the ends of the sleeve. The washer 34 serves to retain the inner closure member on this sleeve while the other washer 33 provides a bearing for the head of the bolt. The strap 27 is adapted to be releasably attached to the outer closure member 26 by means of a snap fastening of the well-known type comprising an inner button 36 carried by the outer closure member 26 and receivable in an apertured button 37 carried by the strap 27. An outwardly flaring or conical skirt 38 is riveted to the outer shell 10 and encloses the end portions of the straps 27 and 28.

The inner closure member 24 comprises a body of yieldable material and preferably is in the form of a plug of spongy or resilient material such as sponge rubber. A similar block or plug 39 is disposed across the inner side of the closed end of the cylinder, and a lining 41 of like material is arranged to extend substantially entirely over the inner side walls of the outer shell 10.

In Fig. 2 a record such as a dictaphone record 42 is shown enclosed in its usual casing 43 and disposed within the carrier body. A plug 44 of cork or other suitable material is fitted within the tapered bore of the record 42 for the purpose of preventing any possible distortion of the record. This plug preferably has a smooth, substantially continuous side wall in the form of a surface of revolution which is complementary to and fits snugly within the tubular article to be carried, as within the bore of a dictaphone record. The parts of the carrier are preferably so proportioned that when a record is enclosed therein, as shown in Fig. 2, the upper closure member 24 will be sufficiently compressed to cause the end portion of the record 42 and its casing 43 to be embedded somewhat in this closure member. Likewise the closure members 24 and 39 at opposite ends of the shell are so arranged that the contained article will bear with sufficient pressure upon these members to cause the same to swell outwardly and to engage or fit snugly against the inner lining of the side walls.

Figure 4:
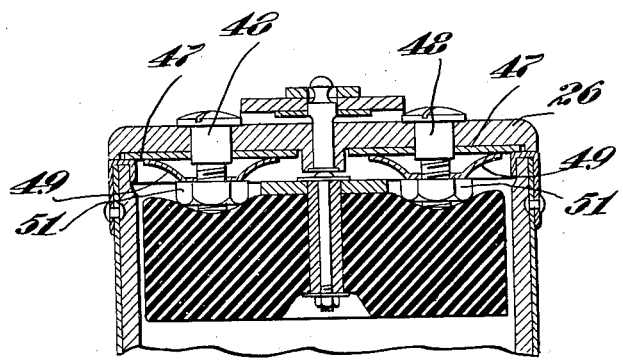
Fig. 4 is a section through the top of the carrier taken substantially along the line 4—4 of Fig. 3.
Figure 7:
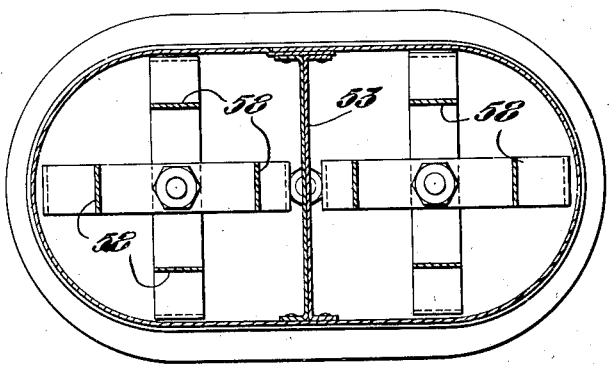
Fig. 7 is a section along the line 7—7 of Fig. 6.
Figure 8:
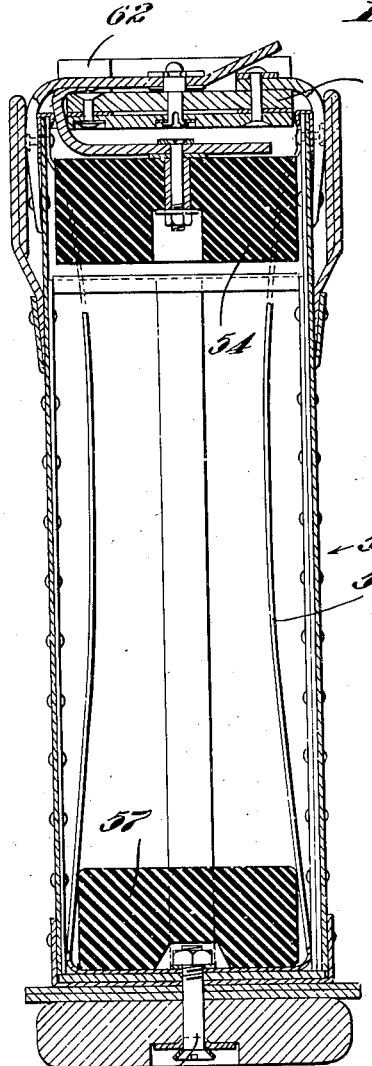
Fig. 8 is a section along the line 8—8 of Fig. 6.
Figure 9:
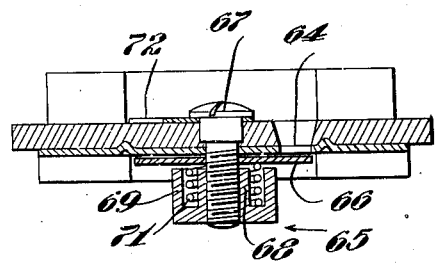
Fig. 9 is a section along the line 9—9 of Fig. 5.

As shown in Figs. 3 and 4, there is provided a means for indicating or designating stations or rerouting points for carriers of this type or other information that may be desired. This means comprises relatively movable indices and indicia, the indices being in the form of apertures or windows 46 formed in the outer closure member, and the indicia being carried by rotary disks 47 (Fig. 4). These disks are mounted upon spindles 48 carried by the outer closure member 26. The spindles are preferably in the form of screws having their heads disposed on the outer surface of the closure member 26 and having their threaded lower ends extending below this closure member and receiving apertured leaf springs 49. The ends of these springs are bent upwardly for frictional engagement with the rotary disks 47. The tension or pressure with which the springs bear against the disks is regulated by the nuts 51 which are threaded on the lower ends of the screws. When the closure members are in position to close the open end of the carrier, as shown in Fig. 4, it will be noted that the upper portion of the inner closure member 24 is caused yieldably to engage the lower ends of the screws 48, and thereby tends to urge these screws upwardly so as to increase the effective pressure of the springs 49 on the rotary disks 47. The parts are preferably so arranged and adjusted that this slight increase in pressure is sufficient to prevent accidental or unintentional rotation of the disks 47 so that once these disks are set to a desired position they will remain in such position until the carrier is opened.

In the modification shown in Figs. 5 to 9, the side walls and closed end of the carrier 52 are in general formed in the same manner as the corresponding parts of the carrier illustrated in Figs. 1 to 4. The carrier 52, however, is oval in cross-section and is provided with a central vertical wall 53 which extends transversely between opposite sides of the shell to separate the same into two compartments. Light openings or exposure windows 55, 55' are provided preferably in the opposite sides of each compartment. The open end of the carrier is provided with inner and outer closure members 54 and 56 which, of course, are of oval shape to fit this type of carrier, but are otherwise of the same general character as the closure members illustrated in Figs. 1 to 4. Likewise an elastic cushion or block of sponge rubber 57 is disposed across the inner side of the closed end of this carrier.

In this form of the invention, however, the lining of spongy material is omitted, and longitudinally disposed, circumferentially spaced yieldable or resilient members 58 are mounted adjacent the inner side walls of each compartment. These resilient or elastic members are in the form of flat springs which have their upper ends affixed to the steel outer shell of the carrier adjacent the open end thereof and are bowed inwardly along the inner side walls yieldably to engage an article disposed within the carrier. Preferably each strip 58 extends to the inner bottom of the carrier below the rubber cushion 57 and transversely across this bottom to the opposite side thereof where the strip again extends longitudinally of the carrier to the upper or open end thereof where it is affixed to the side wall, provided in some instances by the outer shell, and in others by the partition wall 53, as will be apparent from the drawings. Where these strips traverse the bottom of the carrier, they are apertured to receive a retaining bolt 59 which maintains the lower portions of the strips properly centered in the carrier. The outer closure member of this carrier is provided with segmental bumpers 61 and 62 which are attached to this member by means of rivets 63 (Fig. 5).

There is also provided on the outer closure member 56 a relatively movable index and indicia comprising the exposure window 64 (Figs. 5 and 9) and the rotatable disk or the indicia carrier 66. A screw 67 extends through the closure member 56 and carries on its threaded lower end a retaining nut having a central boss 68, which is interiorly threaded to engage the screw, and an outer annular flange 69. A coiled spring 71 is disposed in the space between the boss 68 and the outer flange 69 and is adapted to bear on the under side of the rotary disk 66. Preferably the outer side wall of the flange 69 is knurled or otherwise roughened to facilitate adjustments of the spring 71. An elongate washer 72 is secured to one of the rivets 63 and provides a non-rotatable bearing for the head of the screw 67. It will be evident that when the outer closure member is in open position the indicia carrier 66 may be adjusted manually to the desired position. The parts of this carrier are also arranged and proportioned in a manner similar to that illustrated in Fig. 4 so that when an article is disposed within the carrier and the open end thereof is closed by both the inner and outer closure members, the elastic inner closure member 54 will bear against the knurled nut 65 and thereby cause the spring 71 to engage the rotary disk 66 with sufficient pressure to prevent accidental or unintentional movement of this disk.

Figure 10:
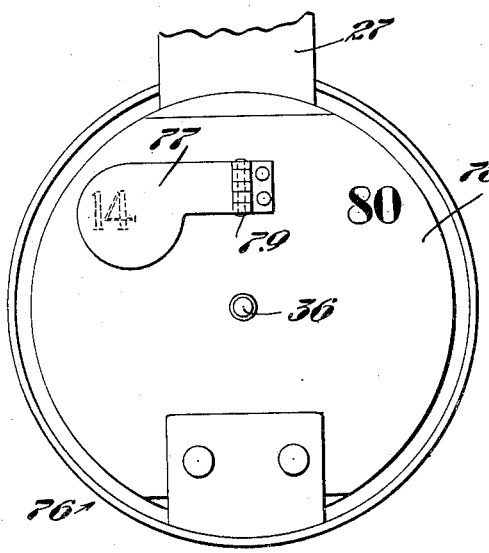
Fig. 10 is a top plan view of a modified form of carrier with the closure-retaining means released.
Figure 11:
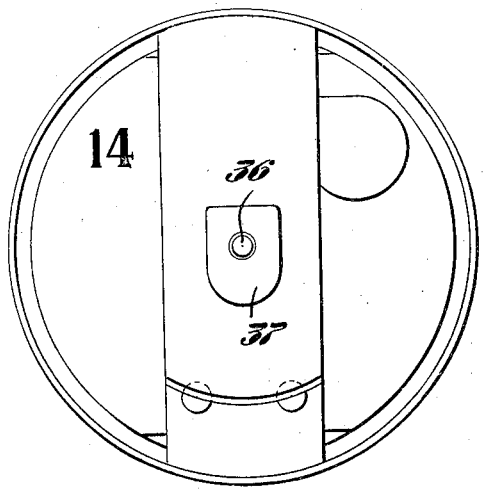
Fig. 11 is a view similar to Fig. 10 but showing the retaining means in position for holding the closure member over the open end of the carrier.

In Figs. 10 and 11 a modified form of carrier 76 is provided with indicating means comprising a movable index or flap 77 which is mounted to swing on an outer closure member 78 by means of a hinge 79. A carrier of this type is adapted to be used only between two stations such, for example, as stations designated by the numerals 80 and 14. When it is desired to despatch the carrier to the station 80, the flap is turned about the hinge 79 so that it occupies the position on the left side of the carrier, as shown in Fig. 10. When in this position the enlarged end of the flap covers the numeral 14. The retaining strap 27 is effective to hold the flap 77 in this position when this strap is attached to the inner member 36 of the snap fastening, as fully described with reference to Figs. 1 and 2. When it is desired to despatch the carrier to the station 14, the flap 77 is turned to the right as shown in Fig. 11 and the strap 27 is then attached to the outer closure member by means of the snap fastening 36, 37, as clearly shown in Fig. 11. In all other respects the carrier 76 may be of the construction illustrated in Figs. 1 and 2.

Figure 12:
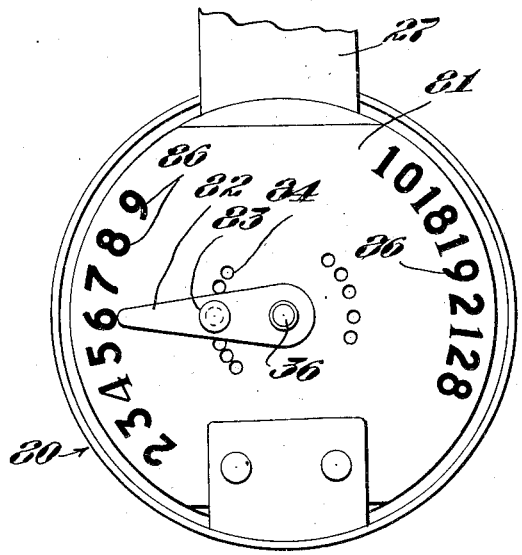
Fig. 12 is a view similar to Fig. 10 but showing a further modification of the invention.

A still further modification of the invention is illustrated in Fig. 12, wherein the carrier 80 is provided with an outer closure member 81 which is similar in general to the closure member 26 illustrated in Figs. 1 and 2. A rotary index 82 is mounted upon this closure member and carries a rivet 83. The lower end of this rivet projects below the index 82 and forms an abutment receivable in each of a plurality of recesses 84. These recesses are arranged in arcuate rows so that when the depending end of the rivet or abutment is lodged in any one of the recesses, the index 82 will be directed at some particular character or combination of characters comprising the indicia 86. When the strap 27 is attached to the part 36 of the snap fastener, it is effective to bear upon the head of the rivet 83 with sufficient pressure to cause the latter to remain lodged in the particular recess in which it happens to be disposed. In this way, the strap 27 is effective to cooperate with the index to prevent accidental or unintentional movement thereof.

It should be understood that the present disclosure is for the purpose of illustration only and that this invention includes all modifications and equivalents which fall within the scope of the appended claims.

We claim:

1. The combination with a carrier having side and end walls, of resilient cushion members disposed substantially across the inner portions of the end walls, and inwardly bowed resilient members disposed along the inner portions of the side walls.

2. The combination with a carrier having side and end walls, of resilient cushion members disposed substantially across the inner portions of the end walls, and circumferentially spaced, inwardly bowed, resilient strips disposed longitudinally along the inner side walls in substantially opposed relation, these strips being affixed to the side walls outwardly of the inner surfaces of the resilient cushion members.

3. The combination with a carrier having an open end, of inner and outer closure members hinged to the side walls adjacent the open end, the inner closure member comprising a yieldable body receivable within and adapted to fit against inner portions of the side walls, the outer closure member being of relatively hard material, and releasable means for retaining the closure members across the open end of the carrier.

4. The combination with a carrier comprising side walls and a fixed end wall, the carrier having an open end, of inner and outer closure members mounted on the side walls to swing across the open end, the inner closure member comprising a body of yieldable material receivable within the open end, the outer closure member being of relatively hard material, and releasable means cooperating with the outer closure member for retaining this member across the open end.

5. The combination with a carrier comprising side walls and a fixed end wall, the carrier having an open end, of inner and outer closure members mounted on the side walls to swing across the open end, the inner closure member comprising a body of yieldable material receivable within the open end, the outer closure member being of relatively hard material, and releasable means carried by the inner closure member and cooperating with the outer closure member for retaining these members within the open end.

6. The combination with a carrier comprising side walls and a fixed end wall and having an open end, of straps affixed to the side walls adjacent the open end and adapted to extend transversely thereof, inner and outer closure members for the open end of the carrier, the inner closure member comprising a body of yieldable material, the outer closure member being of relatively hard material, the outer closure member being carried by one of the straps, the inner closure member being carried by the other strap, and means cooperating with the latter strap and with the outer closure member for releasably retaining this closure member across the open end of the carrier.

7. The combination with a carrier comprising side walls and a fixed end wall, and having an open end, of inner and outer closure members for the open end, the inner closure member comprising a body of yieldable material, the outer closure member being of relatively hard material, straps affixed to the side walls adjacent the open end and adapted to extend transversely thereof, the outer closure member being affixed to one of these straps, means cooperating with the other strap and with the outer closure member for releasably retaining the latter across the open end, and a third strap connected to the latter strap and to the inner closure member, the outer closure member having a portion of its periphery cut away to provide a recess for receiving the third strap.

8. The combination with a carrier having an open end and a removable closure member for the open end, of releasable means for retaining the closure member across the open end, and indicating means comprising relatively movable index and indicia on the closure member, said member retaining means engaging the indicating means when the member is closed to hold the index and indicia in the relation they occupied before the member is closed.

9. The combination with a carrier having an open end and a removable closure member for the open end, of a strap affixed to the body of the carrier and adapted to extend across the open end thereof, means for releasably retaining this strap across the closure member for holding the latter across the open end, a relatively movable index and indicia on the closure member, and means cooperating with the strap for holding the index and indicia in fixed relation.

10. The combination with a carrier having an open end, of removable inner and outer closure members for the open end, the inner closure member comprising a body of yieldable material, the outer closure member being of relatively hard material, a strap affixed to the body of the carrier and adapted to extend transversely of the outer closure member, means for releasably retaining this strap across the outer closure member for holding the latter over the open end, means connecting the inner closure member to this strap, a relatively movable index and indicia on the outer closure member, and means cooperating with the strap for holding the index and indicia in fixed relation.

11. The combination with a carrier having an open end and a removable closure member for the open end, of indicia and a rotary index on the closure member, an abutment on the index, the closure member having a plurality of recesses adapted to receive the abutment, the recesses being so arranged that when the abutment is lodged therein the index will occupy different positions with respect to the indicia, and releasable means for retaining the closure member across the open end, the releasable retaining means being adapted to bear on the index for holding the abutment in one of the recesses.

12. The combination with a carrier having an open end, and a removable closure member for the open end, of a movable member on the closure member for indicating different stations, a strap affixed to the body of the carrier and adapted to extend across the open end thereof, and releasable means for holding the strap across the closure member for holding the latter over the open end, the strap being adapted to bear on the movable member for holding the latter in different positions.

13. The combination with a carrier having an open end, of inner and outer closure members, for the open end, the inner closure member comprising a body of yieldable material, the outer closure member being of relatively hard material, releasable means for retaining the closure members across the open end, relatively movable index and indicia carried by the outer closure member, and means rendered effective when the closure members are held across the open end for holding the index and indicia relatively fixed.

14. The combination with a carrier having an open end, of inner and outer closure members for the open end, the inner closure member being adapted to bear upon an article disposed within the carrier, releasable means for retaining the closure members across the open end, relatively movable index and indicia carried by the outer closure member, the inner closure member being effective when resting on a contained article for holding the relatively movable index and indicia in relatively fixed positions.

15. The combination with a carrier having an open end, of inner and outer closure members for the open end, the inner closure member comprising a body of yieldable material, the outer closure member being of relatively hard material, the inner closure member being adapted to engage an article disposed within the carrier, relatively fixed and movable index and indicia carried by the outer closure member, the inner closure member being effective during engagement with the contained article for bearing against the movable one of these fixed and movable parts for preventing movement thereof.

CHESTER S. JENNINGS.
AUGUST KOENIG.